(12) United States Patent
Reeder et al.

(10) Patent No.: US 7,404,176 B2
(45) Date of Patent: Jul. 22, 2008

(54) CREATING AND USING NESTED CONTEXT STRUCTURES

(75) Inventors: Uwe Reeder, Riegelsberg (DE); Johannes Lauterbach, Heidelberg (DE)

(73) Assignee: SAP AG, Walldorf (DE)

( * ) Notice: Subject to any disclaimer, the term of this patent is extended or adjusted under 35 U.S.C. 154(b) by 723 days.

(21) Appl. No.: 10/858,856

(22) Filed: Jun. 1, 2004

(65) Prior Publication Data
US 2005/0267725 A1 Dec. 1, 2005

(51) Int. Cl.
*G06F 9/44* (2006.01)
(52) U.S. Cl. ...................... 717/104; 717/116
(58) Field of Classification Search ............ None
See application file for complete search history.

(56) References Cited

U.S. PATENT DOCUMENTS

| | | | |
|---|---|---|---|
| 6,880,126 B1 * | 4/2005 | Bahrs et al. | 715/526 |
| 6,952,620 B2 * | 10/2005 | Cherdron et al. | 700/30 |
| 6,996,800 B2 * | 2/2006 | Lucassen et al. | 717/106 |
| 7,225,424 B2 * | 5/2007 | Cherdron et al. | 717/104 |
| 2004/0046789 A1 * | 3/2004 | Inanoria | 345/748 |
| 2006/0101422 A1 * | 5/2006 | Bourges-Waldegg et al. | 717/136 |

* cited by examiner

*Primary Examiner*—Tuan Q. Dam
*Assistant Examiner*—Michael J Yigdall
(74) *Attorney, Agent, or Firm*—Fountainhead Law Group PC

(57) ABSTRACT

Methods and apparatus, including computer program products, for developing and executing applications include using an extended version of the model-view-controller (MVC) paradigm. The techniques include a model for an application, the model including multiple model elements, at least one view for presenting data from the model, the view including multiple user interface (UI) elements, and at least one controller for manipulating the model and the view. The techniques also can include a structure for storing application data according to a predetermined structure for at least one storage area relating to the controller. The predetermined structure can include multiple context elements and directed relationships connecting the context elements, the directed relationships forming at least one cycle between the context elements. The techniques further can include and at least one binding between one of the UI elements and one of the context elements.

11 Claims, 10 Drawing Sheets

CREATING AND USING NESTED CONTEXT STRUCTURES

BACKGROUND

The present invention relates to electronic data processing in general, and particularly to application programming.

In the model-view-controller (MVC) design methodology used for developing application programs, one or more models can implement the application logic of an application program. Each model can correspond to multiple views, where each view displays information about the model to a user. A controller of the application can receive events, for example, raised by a user interacting with a view to manipulate the model.

A model can have multiple controllers, and controllers can relate to one or more views. Controllers can also relate to an application in general, or to one or more application parts or components. Models and controllers typically include application code. When changes occur in a model, the model can update its views.

Data binding can be used for data transport between a view and its model or controller. For example, a table view can be defined to display data of a corresponding table that is stored in the model or controller. The table is used as the data source for the table view (data binding). For instance, the table view can be replaced by a further view, such as a form view, that binds against the same table. In this case, the further view can display the table data without changing anything in the controller or the model.

When building a software application, predefined relationships can exist between various data elements used by the application. Predefined relationships can be defined in a variety of ways; for example, the relationships can be defined through dependencies in a relational database. However, for some data elements, predefined relationships do not exist, for example, when no relationship is defined in a database or when it is data elements that refer to the model on the one hand and to the view on the other hand. Therefore, usually a significant portion of an application's code is devoted to defining the corresponding relationships and to enabling data transport, for example, from the model to the view.

Moreover, at a given point in time, an application has a specific state that reflects the current status of the interaction of the user with the application (e.g., which view the cursor of the application is currently situated on, and which row of a specific table in the view has been selected by the user). Typically, an application developer has to write application coding to memorize and administer the state (e.g., by using state variables).

SUMMARY

The present invention provides methods, systems, and computer program products that implement techniques for extending the MVC methodology by structuring data of an application into application contexts.

In general, in one aspect, a technique can include establishing a model for an application, the model including multiple model elements, establishing at least one view for presenting data from the model, the view including multiple user interface (UI) elements, and establishing at least one controller for manipulating the model and the view. The technique also can include establishing a structure for storing application data according to a predetermined structure for at least one storage area relating to the controller. The predetermined structure can include multiple context elements and directed relationships connecting the context elements, the directed relationships forming at least one cycle between the context elements. The technique can further include establishing at least one binding between one of the UI elements and one of the context elements.

The predetermined structure can be hierarchical in nature. In certain implementations, the predetermined structure is a tree.

The context elements can include multiple nodes and attributes. The nodes can include model nodes and value nodes, the model nodes referencing model elements and the value nodes storing the application data.

In another aspect, a technique can include accessing a predetermined structure for a storage area relating to a controller, the controller being operable to manipulate a model and a view, the view including multiple UI elements for presenting data from the model, and creating an instance of the storage area according to the predetermined structure. The predetermined structure can include multiple design-time context elements and directed relationships between the design-time context elements. The directed relationships can form at least once cycle between the design-time context elements, the cycle including a first design-time context element from the multiple design-time context elements, wherein at least one of the UI elements is bound to one of the design-time context elements. The instance of the storage area can include multiple runtime context elements, each runtime context element corresponding to one of the design-time context elements, wherein at least a first and a second of the runtime context elements correspond to the first design-time context element, and wherein the second runtime context element is nested within the first runtime context element.

The design-time context elements can include nodes, the nodes being arranged in a hierarchy by the predetermined structure, wherein the instance of the storage area includes multiple levels corresponding to the hierarchy, the first runtime context element and the second runtime context element being arranged on distinct levels in the multiple levels. Each runtime context element can include a node collection. The technique can further include a recursive function operable to process the first runtime context element and the second runtime context element.

The techniques can be implemented to realize one or more of the following advantages. A system implementing an extended MVC methodology in accordance with the invention can reduce the amount of storage that is needed to store an interaction status by eliminating redundant data storage. A system implementing an extended MVC methodology can also improve data consistency within an application, by eliminating the program code redundancy that originates from using multiple variables for the same data. Such a system can additionally define relationships between data elements in a declarative way. Therefore, specific functions (e.g., filter functions) can be implemented without application-specific program code. Data relationships can be declared generically, which enables the data relationships to be used by views that are developed using different technologies or formats, (e.g., PDF instead of HTML).

Also, contexts can be defined at design-time using cyclic or recursive context nodes. A recursive context node points to an ancestor node in the design-time context tree that defines the structure of a context. A design-time tree with one or more cycles can be used to create a runtime instantiation of the context with an arbitrarily deep number of levels. That is, a recursive context node represents a point in the runtime instantiation of the context where a node of the type pointed to by the recursive context node (i.e., a node of the same type as the ancestor node to which the recursive context node points) can be added. Accordingly, the runtime instantiation of the context tree can have an unlimited amount of nesting—i.e., an ancestor node that is pointed to by a recursive context node can contain a nested ancestor node, which can contain another nested ancestor node, and so forth. Thus, runtime contexts can contain nested levels of node collections that are arbitrarily deep. Moreover, recursion can be used with contexts, since a function that takes a node of a certain type as an input parameter can keep calling itself with a nested child node that is of the same type until there are no more such nested child nodes.

Contexts with arbitrarily deep levels of nesting, and the recursive functions that can be used to process such contexts, can be conceptually easy to understand, and allow application developers to create and use complex contexts that have intuitive structures. Moreover, complex contexts with arbitrarily deep levels of nesting can be represented efficiently at design-time through the use of recursive context nodes (i.e., through the use of cycles in the design-time structures that define such contexts).

These general and specific aspects can be implemented using a computer program, a method, a system or apparatus, or any combination of computer programs, methods, or systems. The details of one or more embodiments of the invention are set forth in the accompanying drawings and in the description below. Other features, objects, and advantages of the invention will be apparent from the description, the drawings, and the claims.

DETAILED DESCRIPTION

The present invention extends the MVC design pattern to include the concept of contexts. This will be referred to as the extended MVC design pattern.

Figure 1:
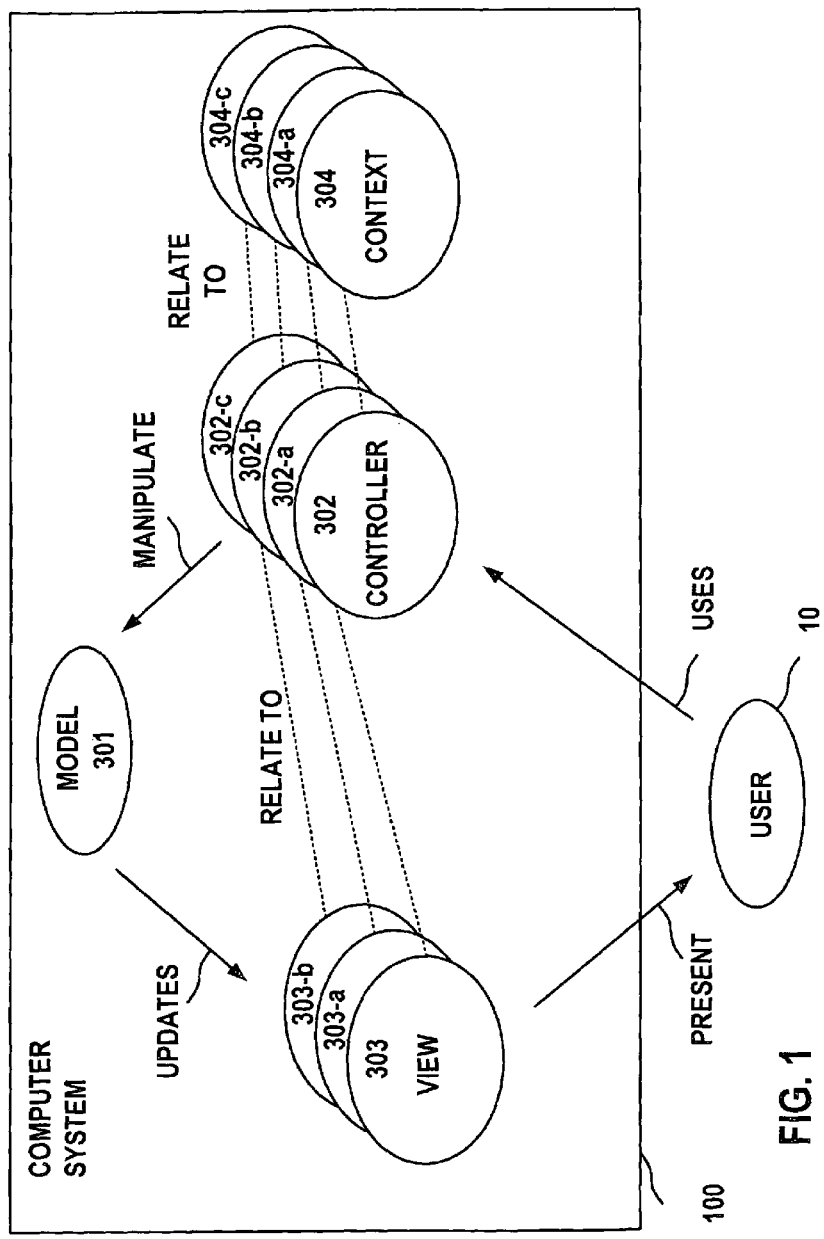
FIG. 1 is a simplified block diagram of a computer system that implements an extended MVC design pattern with application contexts.

FIG. 1 is a simplified block diagram of a computer system 100 that realizes an implementation of the extended MVC design pattern. In general, the extended MVC design pattern provides a context as a storage place for data that relates to a controller. A context can be used to store the local data of a controller, as well as data fields that reference data stored in other contexts or defined in a model (mapping between contexts is explained below). Data in local data fields can exist as long as the corresponding context exists. The lifecycle of data in a model can be managed externally. A context storage space can be structured, as illustrated below.

The user interface (UI) elements in a view can be bound to the data elements in a context. In this manner, multiple UI elements can display the same data (and can be used to modify the data), without having to transport the data between the views or create multiple copies of the data. Moreover, the data elements in a context can be bound to data elements in a model. In this manner, the extended MVC design pattern interposes contexts between views and models. Rather than binding UI elements in views directly to a model, the extended MVC design pattern uses contexts as intermediary storage that stores only the data needed by an application. The contexts can be used to identify, extract, and maintain the user state of an application, which includes the portion of a model that is relevant for a particular application and user. Contexts thus act as a buffer between the views and the model, and allow applications to perform many optimizations—for example, contexts can be used to store recently used data so that such data does not need to be re-calculated in the course of the execution of an application. By acting as buffer, contexts also allow model instances to be used by multiple user instances.

A context instance 304 generally relates (dashed line) to a controller instance 302. Context instances and controller instances will be referred to as contexts and controllers, respectively. The controller 302 can manipulate a model 301 in response to an interaction of a user 10 with the computer system 100. There can be additional controllers (e.g., additional controllers 302-a, 302-b, 302-c) for manipulating the same model 301. The additional controllers can have additional contexts 304-a, 304-b, 304-c that relate (dashed lines) to the additional controllers, respectively. The model 301 can have multiple views (e.g., views 303, 303-a, 303-b) that present data about the model to the user 10. When the model 301 gets modified by at least one of its controllers, it can update its views. Each view relates (dashed lines) to a controller. There can be controllers (e.g., controller 302-c) that do not relate to any view. In certain implementations, a controller can relate to multiple views.

In some application development environments, application development is divided into two general stages: a design-time process and a runtime process. The design-time process can include steps such as designing the views of an application (including the layout of the user interface elements in each view), modeling of the application flow (including the navigation between the views), designing one or more models, and creating and editing other application components, such as controllers and contexts. The design-time process can also include other steps, such as the binding of UI elements within the views to data sources that are defined in a data type repository.

The information created during the design-time process can include application metadata. The application metadata can be stored in a metadata repository, and used as input to the runtime process. During the runtime process, the application metadata can be used to generate the actual runtime code of an application. In some implementations, the application metadata is platform-independent, and the generated runtime code is platform-specific. The runtime code can be executed in a runtime environment that provides a general framework for running applications. For example, a runtime environment can provide services for deploying and maintaining applications, as well as features such as a caching mechanism that can be used to improve performance, and automatic input assistance and default error handling that is based on the declared application metadata.

In the extended MVC design pattern, the declared application metadata includes a description of the data elements in a context and the relationships between those data elements. In one implementation, the context metadata is arranged into a tree structure (referred to as a metadata tree) to reflect a hierarchical relationship between the data elements (e.g., a "customer" data element that includes a "sales order" data element, which in turn includes a "product" data element). A metadata tree can be made up of nodes. Each node can include one or more attributes (which represent the actual data elements), as well as one or more child nodes (which can have further attributes and further child nodes).

In one implementation, a context includes two parts at runtime: (i) a runtime version of the metadata tree, and (ii) an instantiation of the context metadata, which will be referred to as the context tree. The runtime version of the metadata tree is initially the same as the design-time version of the metadata tree, but it can be modified dynamically during the execution of an application (e.g., to add attributes and/or nodes). The context tree (i.e., the instantiation of the context metadata) holds the actual application data and can be constructed according to the structure defined by the runtime version of the metadata tree.

In the context tree, each node in the runtime version of the metadata tree can correspond to a collection (referred to as a node collection) of node elements. Each node element is a single instance of a node (e.g., a particular customer node with a specific name attribute and a specific address attribute). At runtime, a customer node in the context tree might have a node collection of such node elements, because, for example, a view associated with a corresponding controller might be used to provide a list of customers. In this scenario, the context tree associated with the controller has a node element for each customer, and the entire node collection corresponds to the customer node in the metadata tree.

Figure 2:
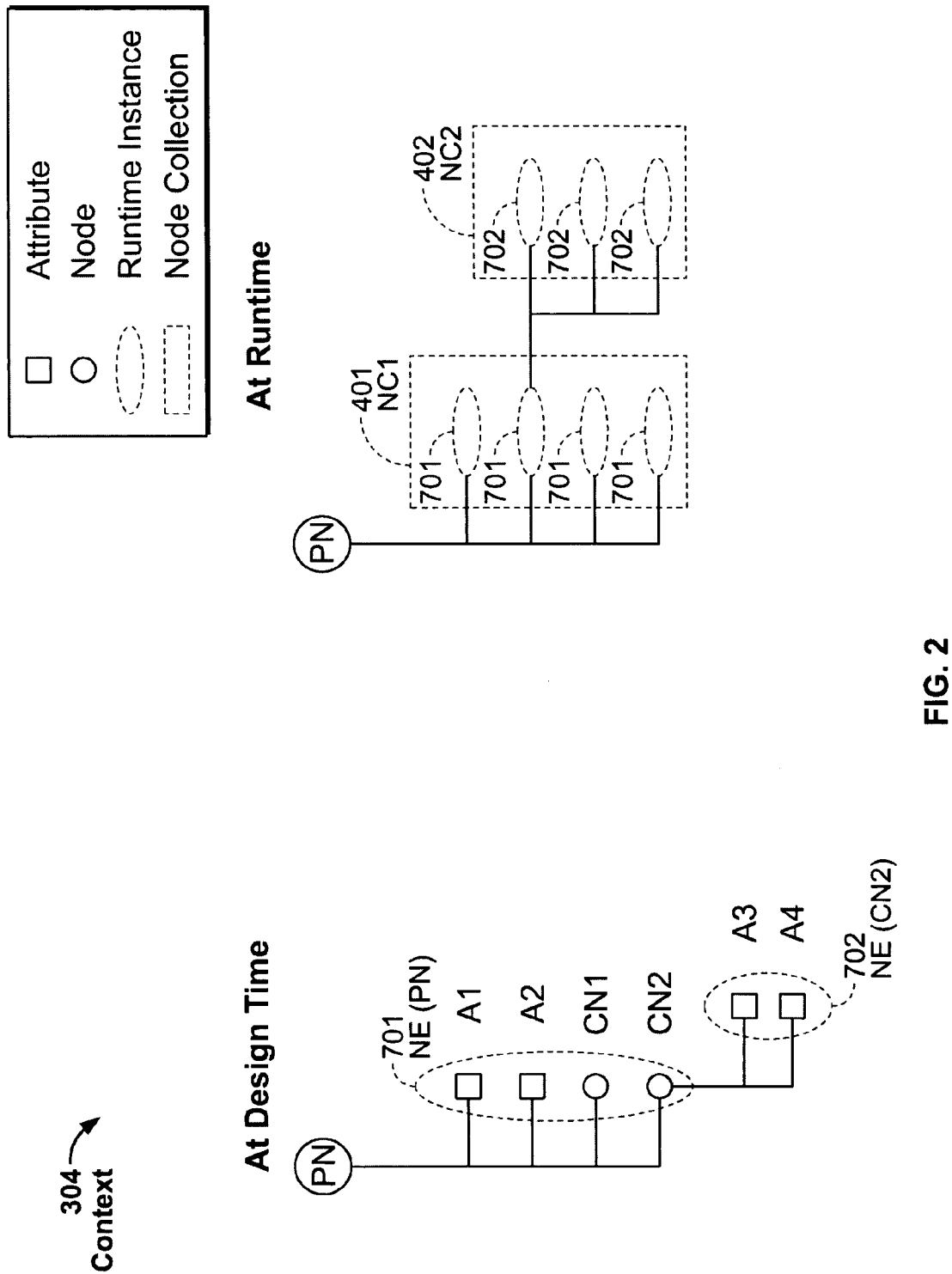
FIG. 2 illustrates an example structure of a context at design-time and at runtime.

FIG. 2 illustrates an example structure of a context 304 at design-time and at runtime. In general, the structure elements of a design-time context structure can be different from the structure elements of a runtime context structure.

An example of a design-time context structure is a node hierarchy (e.g., a metadata tree), wherein the structure elements of the node hierarchy can be nodes and attributes. The root node of the node hierarchy represents the context itself. The child nodes of the root node can be defined by the application. Child nodes of the root node will be referred to as independent nodes. Child nodes of independent nodes depend on their corresponding parent node and will be referred to as dependent nodes.

A node can have a node type. Examples of node types are value nodes and model nodes. A value node can maintain, that is, store and administer, its own application data (transient application data). The data can be, for example, scalar data, tables, or structures. A model node includes a reference to application data that persists in a corresponding model.

A node can also have attributes. Each child node can include an arbitrary tree structure that includes further child nodes and/or attributes. Attributes are leaves in the tree structure. Attributes can represent, for example, scalar data types (e.g., strings and integers), or Java types (e.g., java.util.Date).

In the example shown in FIG. 2, at design-time, the context 304 includes the independent node PN, which includes the two attributes A1 and A2, and which is the parent node of the dependent nodes CN1 and CN2. The second dependent node CN2 has two further attributes, A3 and A4. This structure defines a first node element 701 for the parent node PN and a second node element 702 for the second child node CN2. The first node element 701 includes information about the context structure with regards to the parent node PN. In other words, it describes the context structure level that is under the level of the parent node PN. The second node element 702 includes information about the context structure with regards to the second dependent node CN2. As indicated by the context structure, the second node element 702 depends on the first node element 701.

At runtime, structure elements (e.g., nodes) can represent a set of data instances. Nodes can provide type information about object instances that are maintained by the node. Each node can correspond to a node collection, wherein each element of the node collection has the same node element type.

In the example shown in FIG. 2, at runtime, the parent node PN has a first node collection 401 that includes multiple runtime instances of the first node element 701. Each runtime instance of the first node element 701 can have a second node collection 402 of multiple runtime instances of the second node element 702. A node collection can be empty or have at least one instance of a corresponding node element.

A node collection can have a node collection type (e.g., a list, tree, set, or collection), and a cardinality. The node collection type (examples of which are shown in Table 1 below) and the node collection cardinality (examples of which are shown in Table 2 below) can be declared at design-time. An evaluation mechanism can be used to automatically evaluate the node collection of a child node at runtime when its parent node changes.

TABLE 1

Examples of node collection types

| Type | Meaning |
| --- | --- |
| collection | forward-only iterator (cursor) without absolute positioning |
| set | no duplicates, forward-only iterator without absolute positioning |
| list | duplicates allowed, position available, list iterator, absolute positioning (indexed access) |

The application can use the cardinality of a node collection to restrict possible operations on a node (e.g., prohibiting indexed access to a node that has at most one node collection element).

TABLE 2

Examples of the cardinality of a node collection

| Cardinality | Meaning |
| --- | --- |
| 0 . . . 1 | node collection can be empty, contains at most one element |
| 1 . . . 1 | node collection always contains exactly one element |
| 0 . . . n | node collection can be empty or contain any number of elements |
| 1 . . . n | node collection always contains at least one element |

The content of a node collection can be determined in various ways. The node values of independent nodes can be set by initializers or event handlers, or through a supply function. In one implementation, a supply function is called when a node is first accessed. A node can be accessed, for example, when the node is queried for its data by application code or by a user interface element (in a view) that is bound to the node.

Dependent nodes can get their values through a supply function. For example, the node collection of a dependent node can become obsolete when a selection of its parent node changes (e.g., if a parent "customer" node changes because the user selects a different customer, a child "sales order" node can become obsolete). In this case the dependent node is re-determined, that is, the content of its node collection is determined on a subsequent access. In another implementation, a representation instance is created for each dependent node of a parent node. The values of the representation instances are calculated when the corresponding parent node is accessed. In essence, representation instances create a "load data on demand" or a "unload data when not needed" mechanism, which uses memory in an efficient manner.

The content of a node collection can also be explicitly set to a state, such as "invalid" or "unfilled." When a node having such a state is subsequently accessed, the node collection content is determined again. This can be used to force a re-read of modified data when the modification (e.g., in the model) was not visible to the application runtime.

Figure 3:
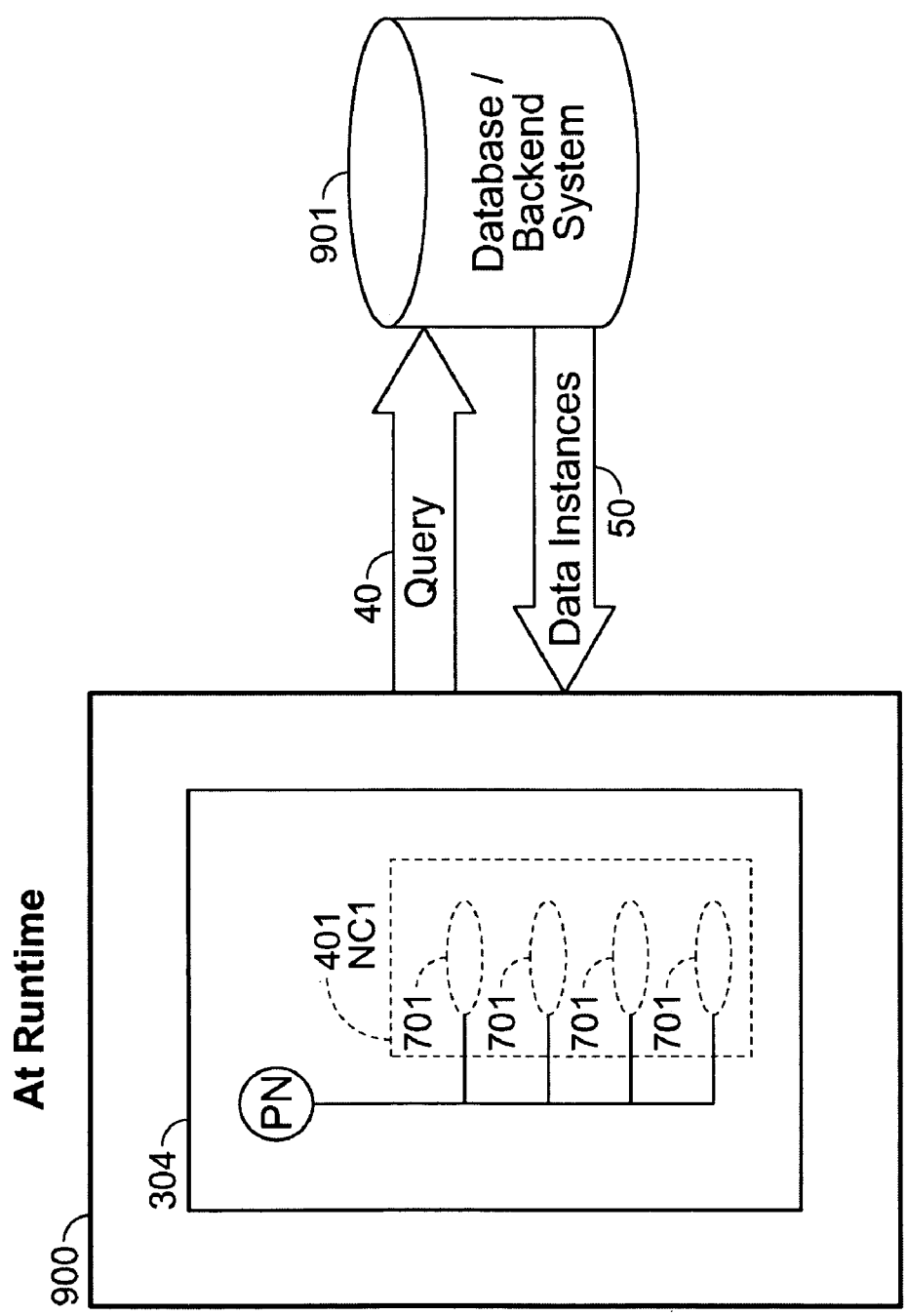
FIG. 3 illustrates a context at runtime as a set of data instances.

FIG. 3 illustrates a context 304 at runtime as a set of data instances. The nodes of the context at runtime represent a system-managed set of data instances (e.g., a java.sql-.RecordSet). For example, data instances are returned 50 from a database or backend system 901 in response to a query (e.g., a structured query language (SQL) query) that is sent 40 from the computer system 900 to the database/backend system 901 when a node is accessed, for example, by an application. Examples of backend systems are Enterprise Resource Planning (ERP) systems, Customer Relationship Management (CRM) systems, web server systems providing web services, or any other system that stores application data. Accessing a node can lead to a data request from an application model, which can result in a corresponding query request to the database/backend system 901.

Nodes can provide type information about the object instances that are maintained by the node. The type information can also be derived from the model. For example, if the parent node PN corresponds to a customer, its node collection 401 can include all orders for this customer. When the application accesses the parent node PN, the computer system 900 can send 40 a query to retrieve all orders of the customer from the corresponding database/backend system 901, such as a sales and distribution (SD) system or a CRM system. The retrieved orders (data instances) are then returned 50 to the computer system 900 context 304 to fill the corresponding data of elements of the node collection 401.

Figure 4:
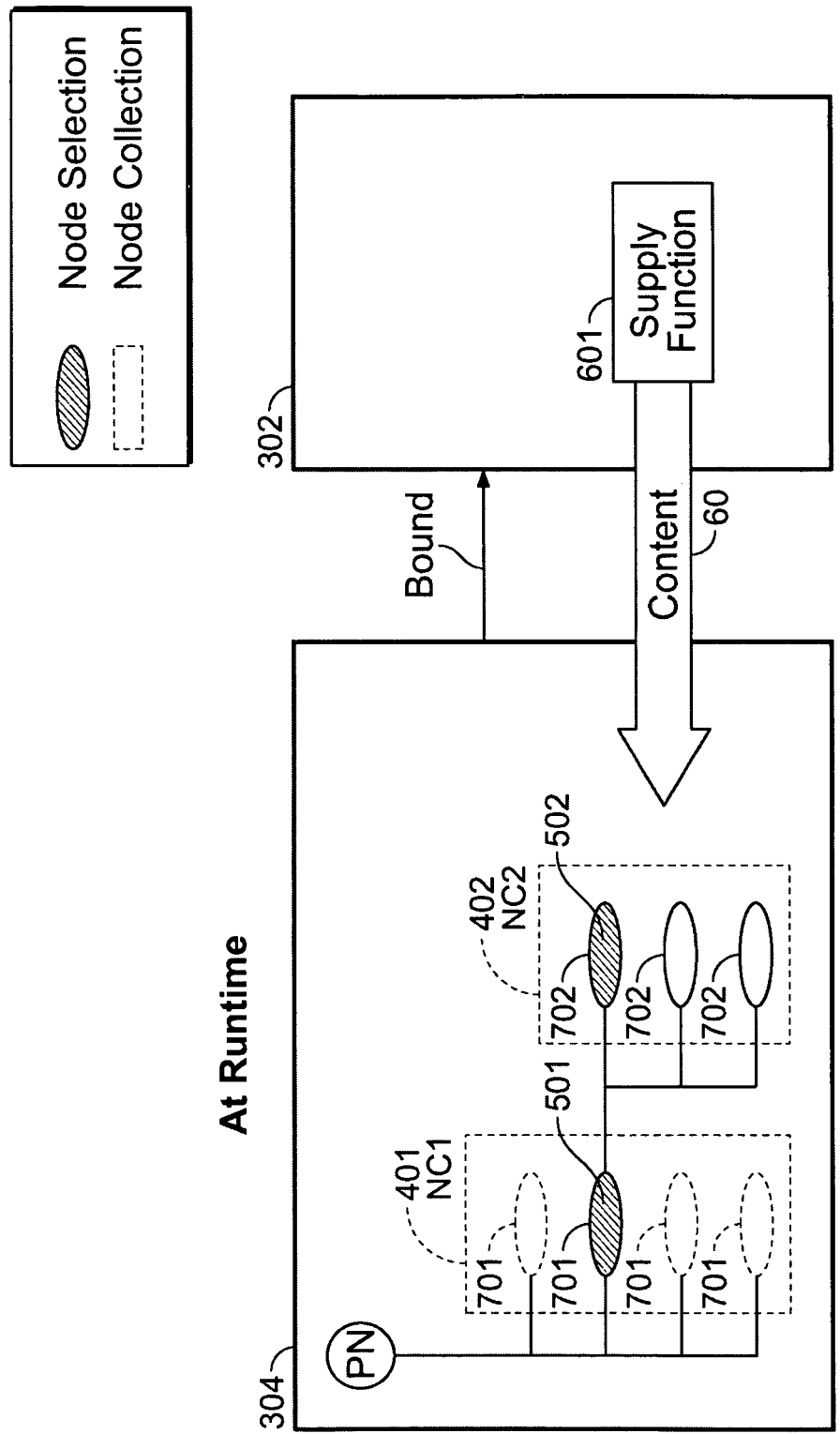
FIG. 4 illustrates an example of a node selection within a context at runtime.

FIG. 4 illustrates an example of a node selection 501 within a context 304 at runtime. A node PN can maintain a node selection 501 within a node collection 401. Node selections are illustrated in FIG. 4 by a grid pattern for each element of the node collection that belongs to the node selection. The node selection 501 is a designated subset of the node collection 401 of the node PN. The node selection 501 has a cardinality that is controlled by the cardinality of the selected nodes declared at design-time (see Table 3 below for examples of the cardinality of a node selection).

One specific element that plays a special role among the elements of the node selection will be referred to as the lead selection element. For example, if the node PN corresponds to customer orders, the first node collection 401 can include all orders of a specific customer. By default, the lead selection of the node collection can be the first order of the customer. In this case, the second node collection 402 can include all order items of the selected order.

TABLE 3

Examples of the cardinality of a node selection

| Node Selection Cardinality | Meaning | Required Node Cardinality |
|---|---|---|
| 0 . . . 1 | single selection (≙lead selection), can be empty | any |
| 1 . . . 1 | single selection (≙lead selection), always contains one element | only 1 . . . 1, 1 . . . n |

TABLE 3-continued

Examples of the cardinality of a node selection

| Node Selection Cardinality | Meaning | Required Node Cardinality |
|---|---|---|
| 0 . . . n | multiple selection, can be empty, if not empty one element is designated as the "lead selection" | only 0 . . . n, 1 . . . n |
| 1 . . . n | multiple selection, one selected element is designated as the "lead selection" | only 1 . . . n |

If a node selection is not empty at runtime, one of the elements of the node selection can be designated as the lead selection element. The lead selection element can be accessed from controller code. UI elements can be bound against the attributes of the lead selection element, and the content of a child node can depend on the lead selection element of its parent node. For example, the node selection 501 can correspond to a selection that results from a user action (e.g., a selection by the user of the second order out of a list of orders.) This can automatically trigger an update of the second node collection 402 with, for example, all order items of the second order. The second node collection 402 can have a further node selection 502. A node selection can also include multiple elements of the corresponding node collection.

Node selection and lead selection elements can be bindable node properties, in the sense that UI elements can represent a node selection (e.g., as selected lines in a table control), and can be used to modify the node selection (e.g., by selecting/deselecting items in a table control, which adds/removes the corresponding elements to/from the node selection). Thus, a selection made by a user can be represented as a node selection and a node selection can be visualized in a UI element. Node selections can also exist on their own.

A context can include a flat set of child nodes (independent nodes), each one independent from the others. Each independent node can have further child nodes (dependent nodes). While the content of an independent node is generally defined by an application, the content of a dependent node can depend on the lead selection element of its parent node. An application can define how the content of a dependent node depends on the parent node's lead selection element through the specification of a supply function. For example, a supply function can be used to specify that when a specific order (e.g., node selection 501) of a customer is selected, only order items that are not on stock should be included in the second node collection 402. In other words, the relationships between data that are declared in the context 304 at design-time can be used to select or filter data at runtime.

As another example, a supply function can be defined in such a way that the function always returns the same value for the same selected node element and does not take into account changes in the returned data. In other words, the application runtime can decide not to call a supply function again with the same arguments when the supply function is called a second time within the lifetime of the application.

As another example, when a parent node (e.g., a sales order) is bound to a new node collection, the content of all of its child nodes (e.g., order items) can be marked "invalid." If a node is accessed when its content (node collection) is marked "invalid," its content can be determined again, for example, by calling a corresponding supply function 601 to supply content for the node.

Supply functions can be declared as methods in a corresponding controller 302 of a context 304. The following pseudo code shows an example of the interface or signature of a supply function:

Collection supplyFunction(Node node, NodeElement parentElement);

The code that is generated for an application can include code that calls a declared supply function when the content for a node is to be supplied 60.

Supply functions can be implemented to include one or more of the following features:

- Node elements included in a returned node collection can match the type of the corresponding node (e.g., a node element created from the node or from a mapped node or from a corresponding model class, if the node is a model node).
- The supply function can return enough data to match the declared cardinality of the node.
- The returned node collection can depend on parameters of the supply function. The supply function can be called a second time within the lifetime of an application when at least one of the parameters is changed.
- The supply function can be loaded on demand by the application.
- The supply function can be used to set the lead selection of a node.

In one implementation, rather than returning a node collection, supply functions can be implemented to modify an existing node collection (e.g., a node collection that is initialized empty). For example, a supply function can be used to provide the content of a node element and add that node element to the node collection to be filled (i.e., the node collection being accessed). Supply functions can also access other node elements, remove node elements, swap or move node elements, and perform other functions on node elements. Supply functions can access the node collection of either the node being supplied or the parent node of the node being supplied. In some implementations, supply functions can also access other ancestor nodes, or even nodes in other contexts. Supply functions generally cannot access child nodes (since child nodes have not been initialized when a node is first accessed), and in some implementations, they are restricted from modifying any node collection other than the node collection being evaluated. In a load-on-demand implementation, initializing a node collection to be empty and allowing a supply function to add elements on demand means that the supply function can access the elements of the collection without causing recursion (i.e., without causing the supply function to be invoked again).

Figure 5A:
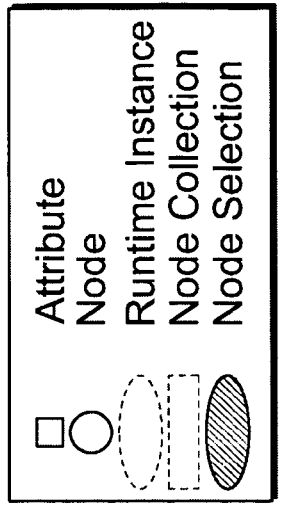
FIGS. 5A and 5B illustrate two alternative runtime implementations of context data instances.
Figure 5A:
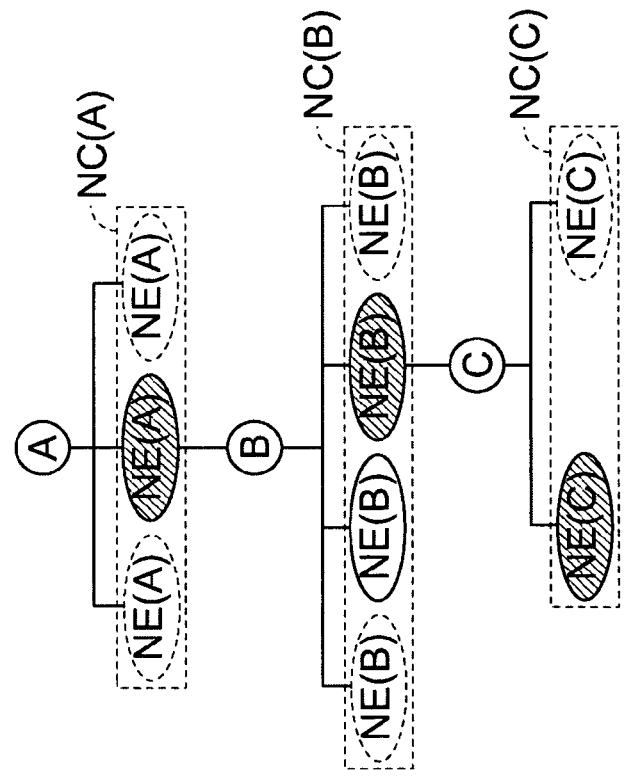
Figure 5A:
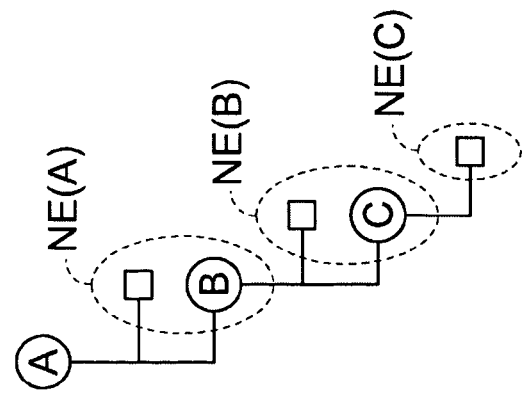
Figure 5B:
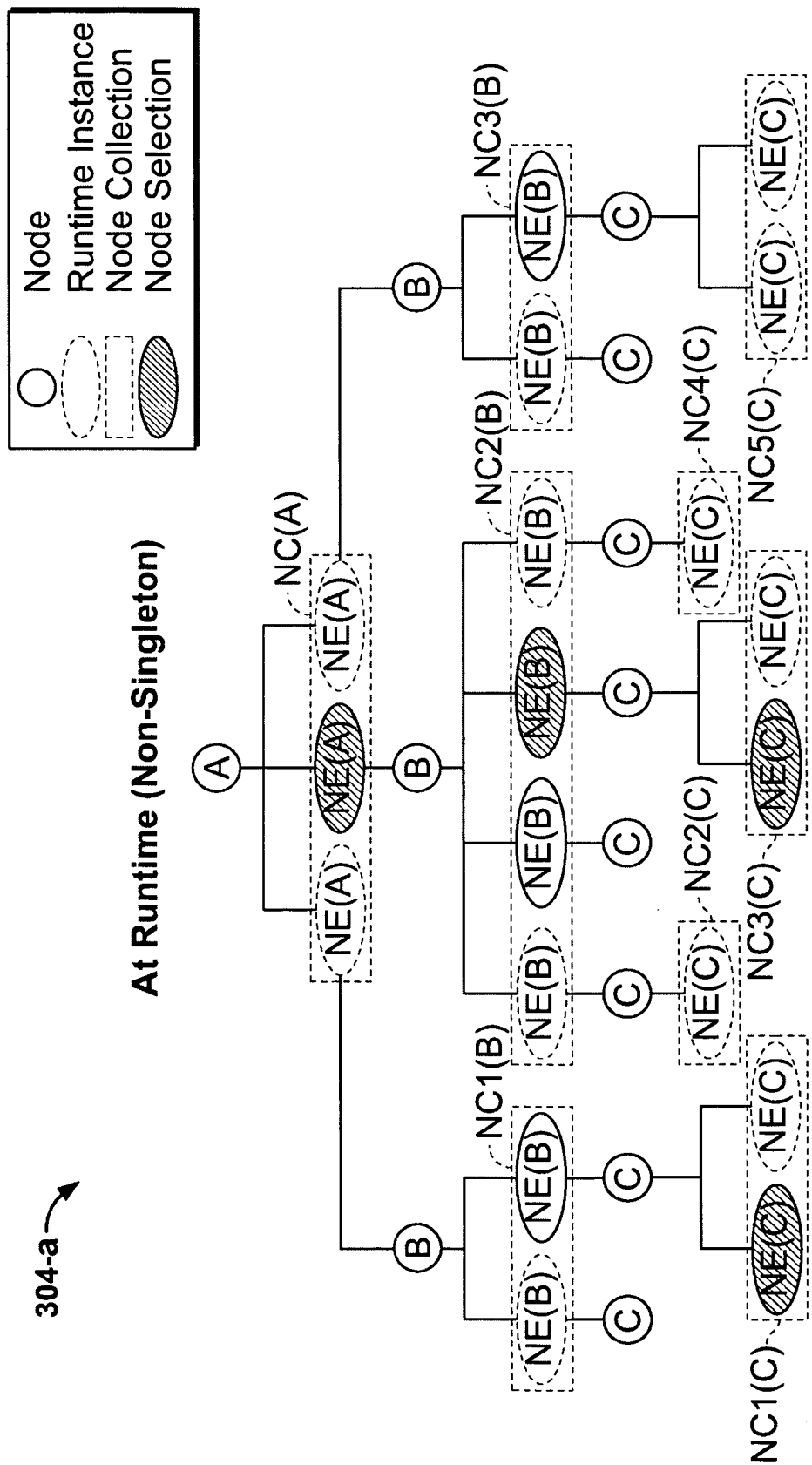

FIGS. 5A and 5B illustrate two alternative runtime implementations of context 304-*a*. In a first implementation (FIG. 5A), a dependent node (e.g., node B) can be represented as a single node instance whose node collection changes whenever the parent node's (e.g., node A) node collection or lead selection element changes. For example, for a single node instance, content (e.g., a node collection) can be maintained for the current lead selection of the parent node only. This can reduce usage of system resources, such as main memory, and enable static binding. Static binding means that a node binds to the "class" of the node instead of binding to a named node instance. A node according to the first implementation will be referred to as a singleton node.

FIG. 5A shows an example of a context structure of context 304-*a* at design-time. Node A has a node element NE(A), node B has a node element NE(B), and node C has a node element NE(C), wherein each element includes child nodes and/or attributes. In a singleton node implementation, at runtime, a node collection NC(B) of node element NE(B) instances is only maintained for the lead selection of the node collection NC(A). Further, a node collection NC(C) of node element NE(C) instances is only maintained for the lead selection of the node collection NC(B).

In a second implementation (FIG. 5B), a single node instance of the node (e.g., node B) exists for each instance in the parent node collection (e.g., each node element in node collection NC(A)). Single node instances can be accessed directly. Single node instances can be created and filled by loading data on demand to reduce resource usage. In the second implementation, an application can also access data of child nodes that do not correspond to the parent node's lead selection element (e.g., address fields for a business partner other than the currently selected business partner). A dependent node according to the second implementation will be referred to as a non-singleton node.

FIG. 5B, which is based on the design-time context structure shown in FIG. 5A, shows an example of a runtime structure of context 304-*a* according to the second implementation. Each instance (node element) in node collection NC(A) can have a node collection—e.g., node collections NC1(B) to NC3(B). Further, each instance of node collections NC1(B) to NC3(B) can have a node collection—e.g., node collections NC1(C) to NC5(C). Empty node collections are not shown in the example.

Information identifying a node as a singleton node or non-singleton node can be stored in a node property "singleton" variable (see Table 4 below for example values for such a variable). If a non-singleton node acts as the parent node of a singleton node, the singleton node is not a singleton node with respect to the context. That is, for each instance of the non-singleton parent node, there exists one instance of the singleton child node. If the child node is a singleton node with respect to the context, then its parent node may change depending on its grandparent node's lead selection element.

A context can keep references to all created instances of a child node until the parent node collection changes. This enables a client in a client-server system to remember data from previously received child node instances and modify such data later. The server can keep such data and maintain a consistent picture of which data is in the current context (e.g., the context of the current view).

TABLE 4

Example values for a node property singleton variable

| Value | Meaning |
| --- | --- |
| True | a single instance of the node exists per parent node; the content of the node changes when the parent node's lead selection element changes |
| False | one instance of the node exists per node element in the parent node's node collection; the content of an instance does not change |

All instances of a child node can be accessed through a typed context application programming interface (API).

If a parent node is a singleton node, only a single instance exists and can be accessed, and its content depends on the parent node's node collection and lead selection element. For example, at design-time, a tree structure can be declared including an independent node "Customers" that has a child node "Orders," which has a further child node "OrderItems." Each customer can have multiple orders, and each order can have multiple order items. This scenario can be reflected in a corresponding context by declaring child nodes belonging to each element of the parent node so that each element has a collection of its own.

Figure 6:
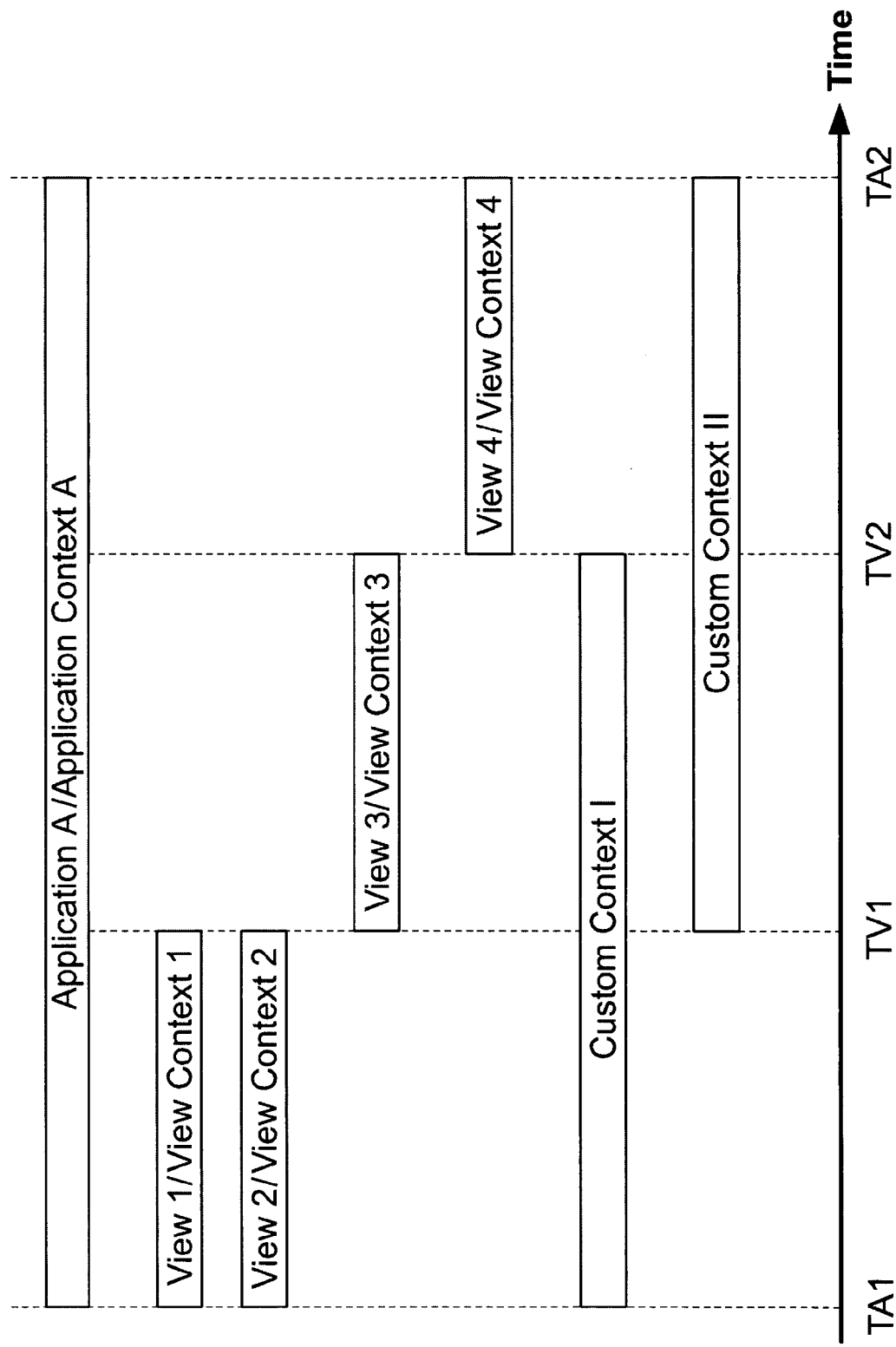
FIG. 6 illustrates an example of context lifetimes for various context types.

In some implementations, there are multiple types of contexts, and the lifetime of a context can depend on its type. FIG. 6 illustrates an example of context lifetimes for various context types. In one implementation, there are at least two types of controllers (view controllers and custom controllers) and, correspondingly, two types of contexts (view contexts and custom contexts).

A view controller relates to a corresponding view. The lifetime of the view controller matches the lifetime of the corresponding view (i.e., the time that the view is displayed). A view context relates to the view controller and has the same lifetime. UI elements of the view can bind to the view context. When executing an application (e.g., APPLICATION A) that is built according to the extended MVC design pattern, typically a sequence of multiple views (e.g., VIEW 1, VIEW 2, VIEW 3, VIEW 4) is presented to a user. The user interacts with the application program through the various views. The various views can raise events that cause the related view controllers to determine which view is presented when and where. Some views, and therefore the related view contexts, can have short lifetimes.

In the example in FIG. 6, APPLICATION A starts at TA1 and ends at TA2. When the application starts, VIEW 1 and VIEW 2 are presented to the user simultaneously. At TV1, the corresponding view controllers determine that the presentation of VIEW 1 and VIEW 2 needs to be replaced by a presentation of VIEW 3. At TV2, the corresponding view controller determines that the presentation of VIEW 3 needs to be replaced by a presentation of VIEW 4. The views VIEW 1 to VIEW 4 relate to the view contexts VIEW CONTEXT 1 to VIEW CONTEXT 4. Accordingly, the data that is stored in each view context has the same lifetime as the view that binds to the data.

Some data needs to span the lifetime of multiple views. A custom context can be defined for this purpose. A custom context can relate to a custom controller of the application. A custom controller can be implemented as view-independent, application-process-oriented code. The lifetime of a custom context can be defined in such a way that it spans the lifetime of multiple views.

In the example of FIG. 6, CUSTOM CONTEXT I is defined to span the lifetime of the views VIEW 1 to VIEW 3. CUSTOM CONTEXT II is defined to span the lifetime of the views VIEW 3 and VIEW 4.

A specific example of a custom context is an application context that persists over the lifetime of the application (i.e., over the sequence of all views of the application). In the case of a custom context, the application specifies the context lifetime, whereas in the case of an application context, the system specifies the context lifetime because the system knows when an application starts (TA1) and when it ends (TA2). Therefore, the system can control an application controller that corresponds to the application context.

Figure 7:
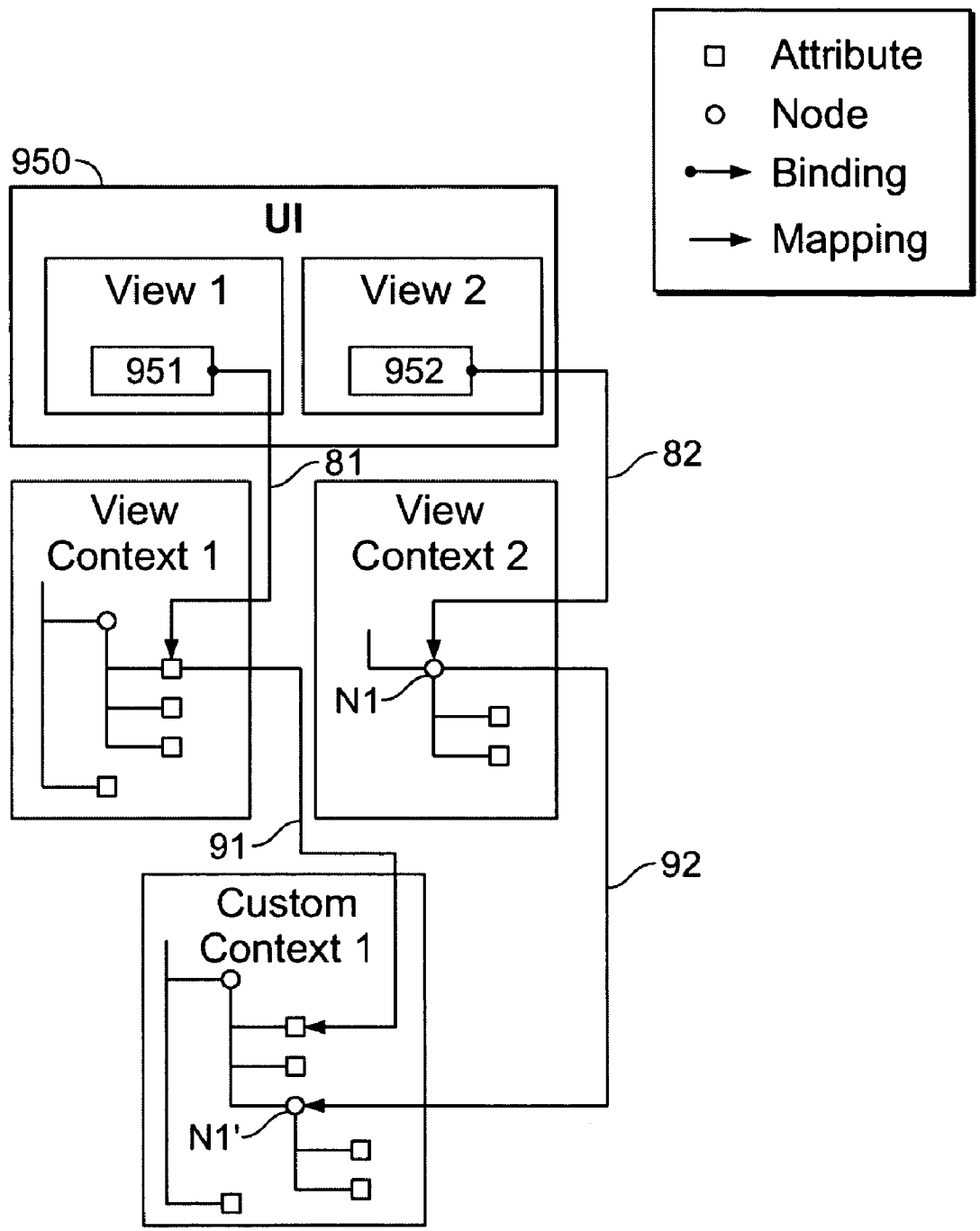
FIGS. 7 and 8 illustrate examples of mappings between contexts.

FIG. 7 illustrates the concept of mappings between contexts. In the example in FIG. 7, UI elements (e.g., UI elements 951, 952) of views (e.g., VIEW 1, VIEW 2) that are used in a user interface 950 bind 81, 82 to view contexts (e.g., VIEW CONTEXT 1, VIEW CONTEXT 2), and long-persisting data resides in custom contexts (e.g., CUSTOM CONTEXT I). In the implementation shown in FIG. 7, nodes and attributes of view contexts and custom contexts can be mapped 91, 92 to nodes and attributes of other custom contexts. In other words, nodes and attributes of view contexts and custom contexts can reference type-compatible nodes and attributes (including individual nodes and entire sub-trees) in other custom contexts. An example of an attribute that can be mapped is an attribute that represents the value of the lead selection element. Nodes can also be mapped to other nodes within the same context.

Node mapping reduces the need for copying data between multiple contexts by enabling a node N1 of a first context (e.g., a view context, such as VIEW CONTEXT 2, or a custom context) to reference 91 a node N1' of a second context (e.g., a custom context, such as CUSTOM CONTEXT I, or an application context), where the node N1' of the second context has or references the data. The same applies for attributes.

In an implementation that permits mappings between contexts, data can be manipulated in a custom (or application) context, and each view context that references the custom context provides its corresponding view with the current data that is stored in the custom context. Mappings can span multiple context levels. For example, a custom context can reference a further custom context. Context hierarchies can thus be created (see, e.g., FIG. 7).

Mappings allow related data to be collected in a dedicated custom context. Binding to such data can be implemented by using a view context that is mapped to the dedicated custom context.

Mappings allow developers to modify an application quickly while maintaining the consistency of the application data. For example, in some cases rearrangement of views or UI elements can be achieved without modifying the code of the corresponding view controllers. This provides a way for application developers to better structure applications in light of potential functional enhancements or changes. For example, reusing a field that already exists in one view in additional views can be achieved by defining an appropriate mapping.

The following two examples explain various features of mappings that can be implemented with the present invention.

In the first example, if a node M ("Mapped Node") is mapped to a node O ("Origin Node"), node M maps its node collection to node O's node collection. The node selections of nodes M and O can also be mapped. Node M can also maintain its own node selection on node O's node collection. The node collection cardinality of node M can equal that of node O (e.g., by inheritance). The selection cardinality can be inherited from origin node O. Node M can also override the node cardinality inherited from node O.

If node O is a singleton node, node M is also a singleton node. If node O is a non-singleton node, node M can either be a singleton node or non-singleton node. If node M is a non-singleton node, it shares the same parent node collection with node O. If node M is a singleton node, then the collection of node M follows the instance of node O that belongs to the lead selection of node O's parent node.

For mapped nodes, the content of a node collection can be defined by the node collection of the origin node.

In the second example, an independent node can also be mapped. The mapping can be to any other node in the same context or to any other node in another context (as long as no cycle is formed with regards to parent-child and mapping relationships).

When a parent node is mapped to a further parent node, a child node of the parent node can be mapped to a further child node of the further parent node. In other words, if node W is a child of node X and node Y is a child of node Z, node W can be mapped to node Y if node X is mapped to node Z. A child node of a mapped node can be unmapped, in which case its content can be determined by a supply function.

If a child node of a mapped node is mapped to a child node of the corresponding origin node, then either the mapped node maps to the node selection of the origin node, or the origin node is a non-singleton node. This avoids a conflict between the dependencies implied by the parent/child relationship and the mapping relationship that results from mapping a selection of a child node of an unmapped node.

Figure 8:
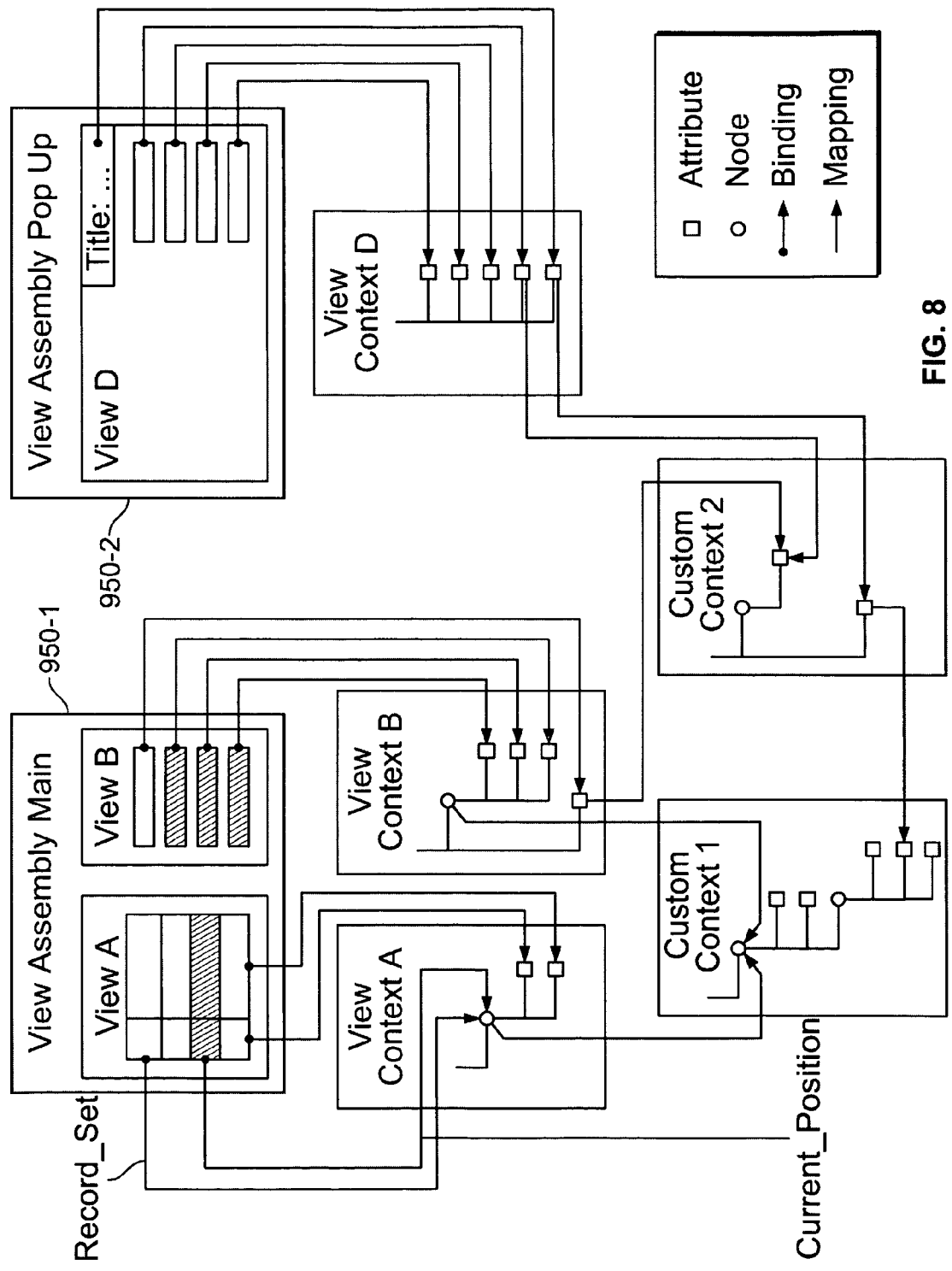

FIG. 8 illustrates another example of mappings between contexts. In this example, two windows 950-1, 950-2 are displayed at runtime on a client of a client-server system. The windows are part of a user interface of an application and can be displayed on a conventional display device (e.g., monitor) of the client. The user interface that is displayed may include one or more view assemblies or view sets.

The first window 950-1 displays view assembly MAIN that includes view A and view B. The second window 950-2 displays view assembly POP UP that includes view D. The following description refers to definitions and declarations at design-time. The views in the view assemblies include UI elements that are bound to the view contexts of the corresponding views. The binding is illustrated by arrows with a bullet point at the origin. UI elements of views A, B, D are bound to view contexts A, B, D, respectively. One UI element in view A is a table having two columns. The four UI elements in view B are display/input fields that have a relationship to the table of view A. The UI elements in view D correspond to a title of the pop up and four further input/display fields.

The view contexts A, B, D include node/attribute hierarchies for maintaining the data of the corresponding views. Nodes and attributes can derive their state from nodes and attributes of other contexts (e.g., custom contexts 1, 2) that relate to controllers other than the corresponding view controllers (e.g., custom or application controllers). This enables data to be maintained without redundant copies. Furthermore, such mappings can be used to synchronize data dependencies among multiple views.

In the example in FIG. 8, view context A and view context B include one independent node each, which is illustrated as the top-level node of the corresponding context structure. The independent node of view A holds information about which record set is to be used for the table and about the current position within the record set. Both independent nodes are mapped to the corresponding independent node in custom context 1. This means that view A and view B share a common data source (e.g., the record set) provided by the commonly used node of custom context 1. Therefore, the record set displayed in the table of view A is also used as the underlying data for view B. For example, view A can display two columns of the record set, whereas view B can display three fields of a selected row of the record set. This is represented in FIG. 8 by the UI elements that are shaded with a grid pattern. The three fields in view B can also serve as input fields to update the underlying record set. If the underlying record set is updated through the input fields in view B, the changes are automatically reflected in view A by virtue of the mappings. View B displays a further field not related to the record set.

The declaration of data relationships through contexts can lead to redundancy-free data transport between the server and the client, and allows the application illustrated in FIG. 8 to synchronize the table of view A with the input in view B. It also allows an application developer to use the current selection in a custom controller without needing to know how the selection was made (e.g., whether the selection was made using a table view UI element, a dropdown list UI element, or any other UI element capable of making a selection in a list). This can decrease the dependency between the application logic and the presentation logic of an application.

Continuing with the example in FIG. 8, context mappings can also be used for a menu/list (e.g., view D in the view assembly POP UP), which can display data based on the current selection without passing any parameters between views or executing any transport code. In FIG. 8, the next-to-last attribute of view context D is mapped to an attribute of custom context 2. Because the last attribute of view context B maps to the same attribute of custom context 2 as the next-to-last attribute of view context D, the content of the upper input/display field in view B is the same as the content of the upper input/display field in view D. No code for transporting data from view B to view D is necessary to achieve this effect.

The last attribute of view context D is mapped to the last attribute of custom context 2, which is in turn mapped to the next-to-last attribute of custom context 1. This illustrates that multi-level context hierarchies can be built. Multi-level context hierarchies are useful for packaging data according to its lifetime because, as explained above, contexts can have different lifetimes. Storing data only once in a context hierarchy and using mappings to access the data through multiple levels of the context hierarchy can avoid redundant storage of data and, therefore, reduce memory consumption.

Figure 9:
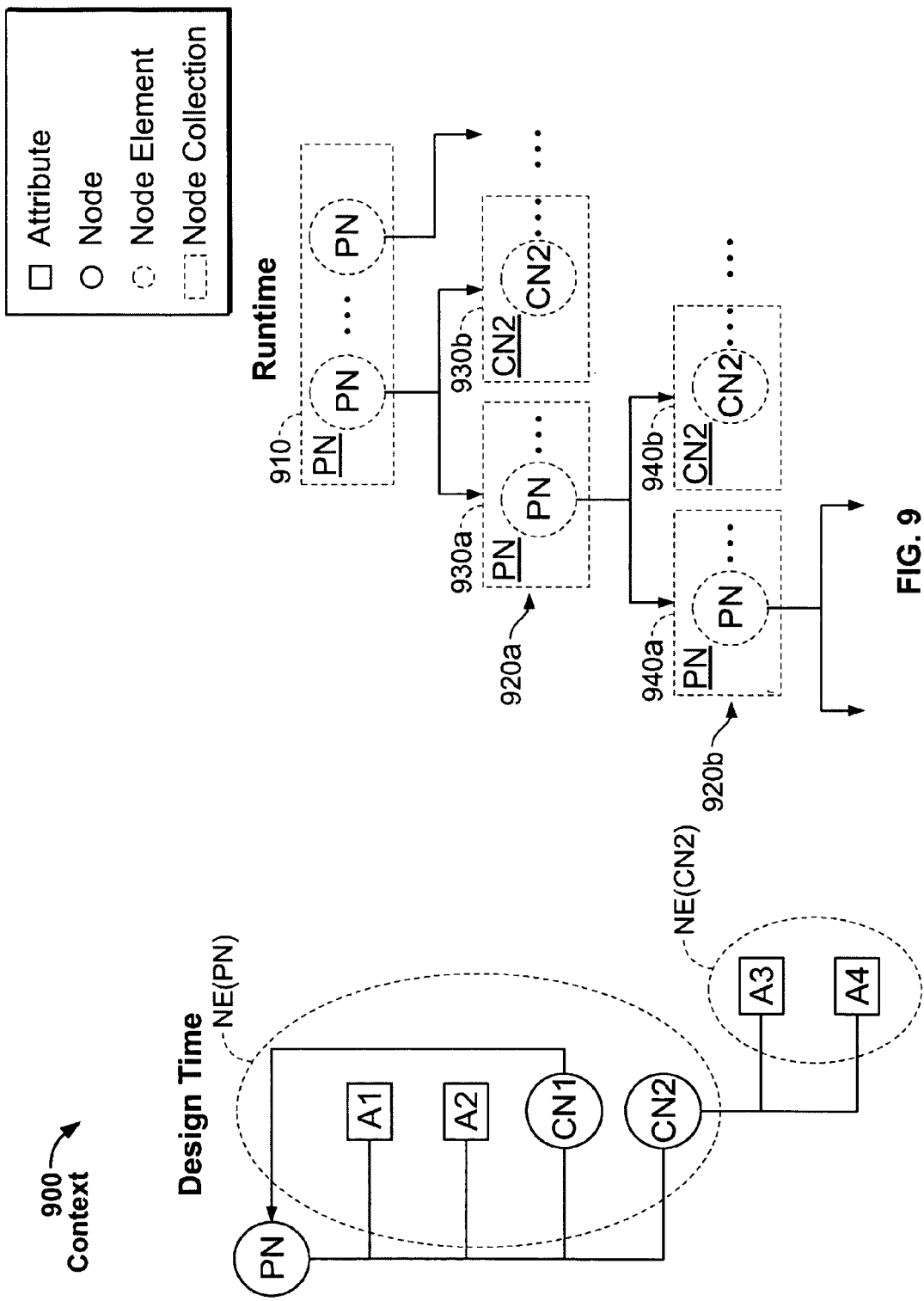
FIG. 9 illustrates an example of a cyclic context structure at design-time and a corresponding instantiation of the context at runtime.

FIG. 9 illustrates an example of a cyclic design-time structure for a context 900, and a corresponding instantiation of the context built according to that structure at runtime. As illustrated, the design-time context structure is a node hierarchy (e.g., a metadata tree) that includes node and attribute structure elements.

In the example in FIG. 9, the design-time structure is cyclic (i.e., it has one or more cycles). Thus, a node in the structure can might point to its parent node, or to an ancestor node that is further up the structure. A reference to an ancestor node indicates that at runtime, the part of the design-time structure represented by the ancestor node can be replicated multiple times.

For example, an "order" node could have two attributes (e.g., "product" and "quantity"), as well as a child node that points back to the order-node. Such a structure can be used to indicate that orders can be nested (i.e., that an order can include a sub-order, which can include another sub-order, etc.).

In one implementation, a node that points to an ancestor node is treated as a virtual node. Rather than having attributes and child nodes of its own, the virtual node references (e.g., points to) an ancestor node in the design-time structure. The referenced node can be a property of the virtual node. The virtual node may be non-singleton and exist once for each element of the parent node.

At runtime, a runtime version of the design-time structure is created. The runtime version of the design-time structure can be similar, perhaps even identical, to the design-time version. However, as explained above, the runtime version can also be dynamically modified during the execution of an application. Thus, the runtime version of the structure can differ from the design-time version.

The nodes in the runtime version of the structure correspond to nodes in the design-time version of the metadata structure. A virtual node in the design-time structure, however, can correspond to a special node in the runtime version of the structure. The special node can indicate that in the instantiation of the context (i.e., in the instantiated context tree), a child node can be added at the point in the context structure where the special node is located, the child node having the type of the node referenced by the corresponding virtual node. For example, assuming that an instantiated context tree has an "order" node (or an "order" node collection, as described in the implementations discussed previously), a special node in the runtime version of the structure can indicate that the "order" node collection can have a child that is itself an "order" node collection.

In one implementation, although the design-time version of a context structure can have cycles, the corresponding instantiated context tree does not itself have cycles. That is, a node collection does not have a child node collection that points back to the first node collection. What the instantiated context tree does have is an arbitrarily deep level of nesting. Thus, if the design-time metadata tree has a node X with a virtual child node that points back to node X, the corresponding instantiated context can include a node collection of type X that has a child node collection of type X, which can in turn have its own child node collection of type X, and so on.

In the example shown in FIG. 9, at design-time, the context 900 includes an independent node PN that includes two attributes A1 and A2, and that is the parent node of the dependent nodes CN1, CN2. The dependent node CN1 is a virtual node, because it refers back to parent node PN. The dependent node CN2 has two attributes A3, A4. This structure defines a node element NE(PN) for the parent node PN and a node element NE(PN) for the dependent node CN2. The node element NE(PN) includes information about the context structure with regards to the parent node PN. The node element NE(CN2) includes information about the context structure with regards to the dependent node CN2.

At runtime, in the instantiated version of the context structure, the parent node PN corresponds to a node collection 910 that includes runtime instances of node element NE(PN). Each runtime instance is a node element of the node collection 910. Node collection 910 may have any number of instances of node element NE(PN).

The contents of the runtime instances of node elements NE(PN) are represented by a multi-level structure 920. (The attributes of the design-time structure are not illustrated here for clarity.) As illustrated, structure 920 has an arbitrary number of levels. Level 920*a* includes node collections 930. Node collection 930*b* corresponds to dependent node CN2 and includes runtime instances of node elements NE(CN2). Node collection 930*a* corresponds to dependent node CN1, which refers to parent node PN. Thus, node collection 930*a* has the properties of parent node PN (e.g., runtime instances of node element NE(PN)). Because the node elements of node collection 930*a* correspond to parent node PN, they have corresponding attributes A1, A2 and dependent nodes CN1, CN2. Level 920*a* may have any number of node collections 920.

Level 920*b* includes node collections 940. Node collection 940*b* corresponds to dependent node CN2 and includes runtime instances of node elements NE(CN2). Node collection 940*a* corresponds to dependent node CN1, which refers to parent node PN. Thus, node collection 940*a* has the properties of parent node PN (e.g., runtime instances of node element NE(PN)). Because the node elements of node collection 940*a* correspond to parent node PN, they have corresponding attributes A1, A2 and dependent nodes CN1, CN2. Level 920*b* may have any number of node collections 940.

Although illustrated as having two levels, the runtime structure may continue to be recursively generated using the design-time structure to represent a data structure having any number of levels. The illustrated runtime structure may, for example, be useful for representing a file directory, where parent node PN corresponds to a folder and child node CN2 corresponds to a file. Thus, a folder node may have a document node and itself as a child node, and the file directory may have any number of nested folders. The illustrated runtime structure may also be used for representing any other appropriate type of repetitive data structure (e.g., orders). Other recursive design-time structures are also possible.

A cyclic design-time context structure provides an efficient manner of representing runtime contexts that can be arbitrarily deep. Arbitrarily deep levels of nesting are conceptually easy to understand and allow application developers to create and use complex contexts that have intuitive structures. Moreover, contexts with arbitrarily deep levels of nesting can be processed with recursive functions, since a function written to process an ancestor node of a certain type can also be used to process a nested descendant node of the same type. In addition to representing arbitrarily deep context structures efficiently, cyclic design-time context structures enable application programmers to easily grasp the nature of the recursive processing that can be used with such contexts.

The invention can be implemented in digital circuitry or in computer hardware, firmware, or software, or in combinations of them. The invention can be implemented as a computer program product (i.e., a computer program tangibly embodied in an information carrier (e.g., in a machine-readable storage device or in a propagated signal)) for execution by, or to control the operation of, a data processing apparatus (e.g., a programmable processor, a computer, or multiple computers). A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method operations of the invention can be performed by one or more programmable processors executing a computer program to perform functions of the invention by operating on input data and generating output. Method operations can also be performed by, and an apparatus of the invention can be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory, or a random access memory, or both. The essential elements of a computer are a processor for executing instructions and one or more memory devices for storing instructions and data. Generally, a computer will also include, or be operatively coupled to receive data from, transfer data to, or both, one or more mass storage devices for storing data (e.g., magnetic, magneto-optical, or optical disks). Information carriers suitable for embodying computer program instructions and data include all forms of non-volatile memory, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in special purpose logic circuitry.

To provide for interaction with a user, the invention can be implemented on a computer having a display device (e.g., a CRT (cathode ray tube) or FPD (flat panel display) (e.g., LCD (liquid crystal display)) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual, auditory, or tactile); and input from the user can be received in any form, including visual, auditory, or tactile input.

The invention can be implemented in a computing system that includes a back-end component (e.g., a data server), a middleware component (e.g., an application server), a front-end component (e.g., a client computer having a graphical user interface or a Web browser through which a user can interact with an implementation of the invention), or any combination of such back-end, middleware, and front-end components. The components of the system can be interconnected by any form or medium of digital data communication (e.g., a communication network). Examples of communication networks include a local area network ("LAN") and a wide area network ("WAN") (e.g., the Internet).

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations. Other implementations are within the scope of the following claims.

The invention claimed is:

1. A computer program product, tangibly embodied in a machine-readable storage device, the computer program product comprising instructions operable to cause a data processing apparatus to:
    establish a model for an application, the model including multiple model elements;
    establish at least one view for presenting data from the model, the view including multiple user interface (UI) elements;
    establish at least one controller for manipulating the model and the view;
    establish a structure for storing application data according to a predetermined structure for at least one storage area relating to the controller, the predetermined structure including multiple design-time context elements arranged in a hierarchy having a plurality of levels and directed relationships connecting the design-time context elements, the directed relationships forming at least one cycle between the design-time context elements, the cycle including at least a first design-time context element on a first level and a second design-time context element on a second level;
    establish at least one binding between one of the UI elements and one of the design-time context elements and
    creating an instance of the storage area according to the predetermined structure, the instance of the storage area including multiple runtime context elements, each runtime context element corresponding to one of the design-time context elements, wherein at least a first and a second of the runtime context elements correspond to the first design-time context element, and wherein the second runtime context element is nested within the first runtime context element;
    wherein the design-time context elements include nodes, the nodes being arranged in a hierarchy by the predetermined structure, and wherein the instance of the storage area includes multiple levels corresponding to the hierarchy, the first runtime context element and the second runtime context element being arranged on distinct levels in the multiple levels.

2. The computer program product of claim 1, wherein the predetermined structure is a tree.

3. The computer program product of claim 1, wherein the design-time context elements include attributes.

4. The computer program product of claim 3, wherein the nodes comprise model nodes and value nodes, the model nodes referencing model elements and the value nodes storing the application data.

5. A computer implemented method comprising:
    establishing a model for an application, the model including multiple model elements;
    establishing at least one view for presenting data from the model, the view including multiple user interface (UI) elements;
    manipulating the model and the view using at least one controller;
    storing application data according to a predetermined structure for at least one storage area relating to the controller, the predetermined structure including multiple design-time context elements arranged in a hierarchy having a plurality of levels and directed relationships connecting the design-time context elements, the directed relationships forming at least one cycle between the design-time context elements, the cycle including at least a first design-time context element on a first level and a second design-time context element on a second level;
    binding at least one of the UI elements and one of the design-time context elements; and
    creating an instance of the storage area according to the predetermined structure, the instance of the storage area including multiple runtime context elements, each runtime context element corresponding to one of the design-time context elements, wherein at least a first and a second of the runtime context elements correspond to the first design-time context element, and wherein the second runtime context element is nested within the first runtime context element,
    wherein the design-time context elements includes nodes, the nodes being arranged in a hierarchy by the predetermined structure, and wherein the instance of the storage area includes multiple levels corresponding to the hierarchy, the first runtime context element and the second runtime context element being arranged on distinct levels in the multiple levels.

6. The method of claim 5, wherein the predetermined structure is a tree.

7. The method of claim 5, wherein the design-time context elements include attributes.

8. The method of claim 7, wherein the nodes comprise model nodes and value nodes, the model nodes referencing model elements and the value nodes storing the application data.

9. A computer program product, tangibly embodied in a machine-readable storage device, the computer program product comprising instructions operable to cause data processing apparatus to:
    access a predetermined structure for a storage area, the storage area relating to a controller, the controller being operable to manipulate a model and a view, the view including multiple UI elements for presenting data from the model, wherein the predetermined structure includes multiple design-time context elements arranged in a hierarchy having a plurality of levels and directed relationships between the design-time context elements, the directed relationships forming at least once cycle between the design-time context elements, the cycle including at least a first design-time context element on a first level and a second design-time context element on a second level, and further wherein at least one of the UI elements is bound to one of the design-time context elements; and create an instance of the storage area according to the predetermined structure, the instance of the storage area including multiple runtime context elements, each runtime context element corresponding to one of the design-time context elements, wherein at least a first and a second of the runtime context elements correspond to the first design-time context element, and wherein the second runtime context element is nested within the first runtime context element; and wherein the design-time context elements include nodes, the nodes being arranged in a hierarchy by the predetermined structure, and wherein the instance of the storage area includes multiple levels corresponding to the hierarchy, the first runtime context element and the second runtime context element being arranged on distinct levels in the multiple levels.

10. The computer program product of claim 9, wherein each runtime context element comprises a node collection.

11. The computer program product of claim 9, wherein the computer program product further comprises a recursive function operable to process the first runtime context element and the second runtime context element.

* * * * *